US006543788B2

(12) United States Patent
Ito

(10) Patent No.: US 6,543,788 B2
(45) Date of Patent: Apr. 8, 2003

(54) SEAL STRUCTURE

(75) Inventor: Unji Ito, Matsumoto (JP)

(73) Assignee: Izumi Products Company, Nagano (JP)

( * ) Notice: Subject to any disclaimer, the term of this patent is extended or adjusted under 35 U.S.C. 154(b) by 69 days.

(21) Appl. No.: 09/880,374

(22) Filed: Jun. 13, 2001

(65) Prior Publication Data

US 2001/0050463 A1 Dec. 13, 2001

(30) Foreign Application Priority Data

Jun. 13, 2000 (JP) ....................................... 2000-176205

(51) Int. Cl.[7] .......................... F16J 15/02; F16B 39/02; F16B 1/00; B26B 19/14

(52) U.S. Cl. ......................... 277/630; 277/637; 411/82; 411/82.1; 403/269; 30/43.4

(58) Field of Search ................................ 277/628, 630, 277/637, 639, 640, 641, 642, 644, 650, 651, 652, 654; 411/82, 82.1, 258, 930; 403/265, 269; 30/43.4–43.92; 264/271.1, 318, 328.1

(56) References Cited

U.S. PATENT DOCUMENTS

| | | | | | |
|---|---|---|---|---|---|
| 2,797,944 | A | * | 7/1957 | Riesing | 277/573 |
| 4,602,125 | A | * | 7/1986 | West et al. | 174/138 G |
| 4,825,023 | A | * | 4/1989 | Morse | 200/302.2 |
| 4,975,008 | A | * | 12/1990 | Wagner | 411/337 |
| 5,165,834 | A | * | 11/1992 | Takenouchi et al. | 411/542 |
| 5,222,850 | A | * | 6/1993 | Medal | 411/82.1 |
| 5,409,337 | A | * | 4/1995 | Muyskens et al. | 411/148 |
| 5,722,631 | A | * | 3/1998 | Dorton | 248/635 |
| 5,857,817 | A | * | 1/1999 | Giannuzzi et al. | 411/82.3 |
| 6,017,176 | A | * | 1/2000 | Marui | 411/82 |
| 6,138,980 | A | * | 10/2000 | Farbotnik | 248/638 |
| 6,305,083 | B1 | * | 10/2001 | Rijken et al. | 30/43.6 |
| 6,369,341 | B2 | * | 4/2002 | Katsumi | 200/302.2 |

FOREIGN PATENT DOCUMENTS

| | | | |
|---|---|---|---|
| DE | 44 40 852 | | 6/1996 |
| EP | 0 311 178 | | 4/1989 |
| EP | 0 670 613 | | 9/1995 |
| EP | 0 791 850 | | 8/1997 |
| JP | 2000042264 A | * | 2/2000 |
| WO | WO 00/24565 | | 5/2000 |

* cited by examiner

*Primary Examiner*—Lynne H. Browne
*Assistant Examiner*—Vishal Patel
(74) *Attorney, Agent, or Firm*—Koda & Androlia

(57) ABSTRACT

A seal structure between a first member that has a recessed section and a second member that has a protruding section on its rear surface and is provided on its front surface with an elastomer covering layer so that the protruding section is inserted into the recessed section. The second member is provided with a through-hole that passes through the second member and is formed in positions located at a circumferential edge of the protruding section of the second member. The second member is further provided with a tubular covering layer of an elastomer, the tubular covering layer being formed on the outer circumference of the protruding section so that the tubular cover layer is continuous of the covering formed on the front surface of the second member via the through-hole.

3 Claims, 6 Drawing Sheets

SEAL STRUCTURE

BACKGROUND OF THE INVENTION

1. Field of the Invention

The present invention relates to a seal structure between two members and more particularly to a seal structure comprised of a recessed sections of first member and protruding sections of second member.

2. Prior Art

FIG. 9 shows a conventional example of a seal structure between two components connected by screws. In this seal structure, a first member 10 and a second member 12 are combined with the back surface of the second member 12 fitted against the front surface of the first member 10. Then, these two members 10 and 12 are formed into a single unit using a screw 14.

More specifically, in the front surface of the first member 10, a recessed section 16 is formed; and a protruding section 18 that has a shape fitting into the recessed section 16 of the first member 10 is formed in the back surface of the second member 12. The protruding section 18 is inserted into the recessed section 16. Moreover, the screw 14 is screwed into a screw hole 22 formed in the tip end of the protruding section 18 from an opening 20 formed in the bottom of the recessed section 16. By way of this screw 14, the second member 12 is pulled against the first member 10, and these two members are formed into a single unit so that the front surface of the first member 10 and the back surface of the second member 12 are in contact with each other.

In the above structure, when an airtight or watertight seal is to be formed between region A of the front surface of the second member 12 and region B of the back surface of the first member 10, a seal is employed. The seal is provided between the back surface of the second member 12 and the front surface of the first member 10 inside the recessed section 16. In this case, the external diameter of the protruding section 18 is made smaller than the internal diameter of the recessed section 16, so that there is a gap between the outer circumferential surface of the protruding section 18 and the inner circumferential surface of the recessed section 16. An O-ring 24 that is thick enough to fill this gap is mounted on the protruding section 18, and the protruding section 18 is inserted into the recessed section 16. A seal is thus formed by the O-ring 24.

However, in the above-described conventional seal structure, the O-ring 24 needs to be mounted on the protruding section 18. As a result, the overall amount of work required for obtaining the sealing increases. Furthermore, even after the O-ring 24 is mounted on the protruding section 18, the O-ring 24 is anchored merely on the protruding section 18 as a result of being tightened against the protruding section 18 by its own radial contractive force. Accordingly, if an external force that causes the O-ring 24 to slide along the outer circumferential surface of the protruding section 18 against the radial contractive force is applied, the O-ring 24 would slip off of the protruding section 18.

There are various kinds of household electrical appliances (products consisting of resin molded articles, electric shavers, driers, electric hair-trimmers, electric toothbrushes, information terminals such as portable telephones, etc.) that are comprised of two elements combined as in the above-described first and second members 10 and 12. In one example, a covering layer made of an elastomer (e.g., a cosmetic layer) is disposed on the front surface of one member to form an outer panel, and this outer panel is attached to the front surface of another member that is a main body casing of an electrical product.

In this household electrical product, at least the member that is the outer panel is made from a resin molding in order to reduce the weight of the product. When a covering layer is formed on the surface of the outer panel, the covering layer of an elastomer is integrally formed on the surface of this outer panel by insert molding method.

The elastomer that forms the covering layer is a polymer that has rubber-like elasticity at ordinary temperatures, and it includes natural rubbers, any of various types of synthetic rubbers, reclaimed rubbers, acrylic resins, etc. The inventor of the present application believed that it would be possible to use such an elastomer as a sealing material instead of O-rings 24.

SUMMARY OF THE INVENTION

Accordingly, the object of the present invention is to solve the above-described prior art problems.

More specifically, the object of the present invention is to provide a seal structure in which an elastomer that constitutes a covering layer formed on the surface of a constituting element of, for instance, an electric appliances, used as a sealing material, thus eliminating the use of O-rings.

The above object is accomplished by a unique-structure of the present invention for a seal structure between a first member and a second member that are assembled into a single unit so that a protruding section formed in the second member that has a covering layer of an elastomer formed on its front surface is fitted into a recessed section of the first member; and in the unique structure of the present invention, a through-hole that passes through the second member is formed in a position that corresponds to the circumferential edge of the protruding section of the second member, and a tubular covering layer of the elastomer is formed on the outer circumferences of the protruding section so that the tubular cover layer is continuous with the covering layer of the front surface of the second member via the through-hole.

With the structure above, the covering layer that covers the outer circumference of the protruding section contacts tightly to both the outer circumferential surface of the protruding section and the inner circumferential surface of the recessed section when the protruding section is inserted into the recessed section. Consequently, the space between the protruding section and the recessed sections is sealed. Furthermore, when the covering layer is formed on the surface of the second member by insert molding, the covering layer is simultaneously formed on the outer circumference of the protruding section by allowing the elastomer to flow in to around the outer circumference of the protruding section that is on the back surface of the second member via the through-hole. Accordingly, O-rings become unnecessary, and the number of components required is reduced. Also, the work required to attach such components can be eliminated, and the overall amount of work to assemble two members into a single body is reduced.

In the above structure, the external diameter of the covering layer that is formed on the outer circumference of the protruding section is set so as to be larger than the internal diameter of the recessed section.

In the present invention, the covering layer that covers the outer circumference of the protruding section can be formed so as to protrude from the tip end of the protruding section. By way of this structure, even if the external diameter of the covering layer that cover the outer circumference of the protruding section is slightly smaller than the internal diameter of the recessed section, the portion of the covering layer that protrudes from the tip end of the protruding section forms a seal between the protruding section and recessed section since it contacts the bottom of the recessed section.

Furthermore, the first member can be a part of the main body casing of an electric shaver, and the second member can be a part of the outer panel of such a shaver. In this structure, the outer panel is fitted to the main body casing, thus providing a waterproof electric shaver or a waterproof electric shaver body.

DETAILED DESCRIPTION OF THE INVENTION

Figure 1A:
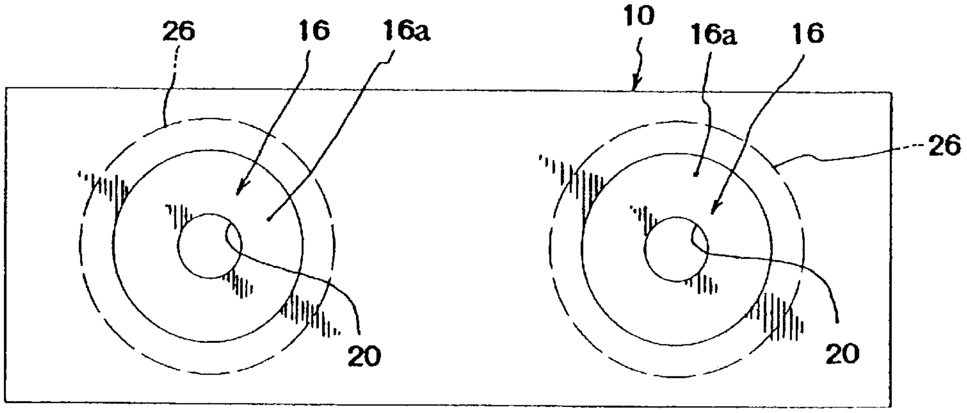
FIG. 1A is a top view that illustrates the structure of one embodiment of a first member in the seal structure of the present invention.

Preferred embodiments of the seal structure of the present invention will be described in detail below with reference to the accompanying drawings.

First, the structure of one embodiment of the first member 10 and second member 12 will be described with reference to FIGS. 1 through 3. The elements that are the same as those of the conventional example are labeled with the same reference numerals, and a detailed description of such constituting elements is omitted.

Figure 1B:
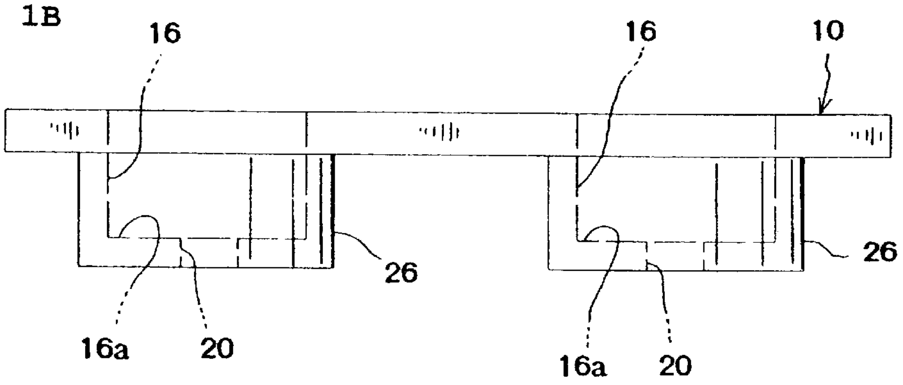
FIG. 1B is a front view thereof.

As shown in FIG. 1A, the first member 10 has a plate-form external shape, and a recessed section 16 (the shown embodiment has two recessed sections 16) that opens on the front surface side is formed in this first member 10. Because of the thickness of the first member 10 (or since the first member 10 has a small plate-thickness or merely a small thickness), the recessed sections 16 in this embodiment are formed inside cylindrical portions 26 that project from the back ("bottom" in FIG. 1A) surface of the first member 10. The depth of the recessed sections 16 is greater than the thickness of the first member 10 in the shown embodiment, and the recessed sections 16 are formed with, for example, a circular shape when seen from above as seen from FIG. 1A. Furthermore, an opening hole 20 through which a screw 14 is passed is formed in the center of the bottom **16*a* of each recessed section 16. In the above description, if the thickness of the first member 10 is sufficiently large, there is no need to form the cylindrical bodies 26 to project from the back surface of the first member 10; and instead, the recessed sections 16 can be formed within the range of the thickness of the first member 10**.

Figure 2A:
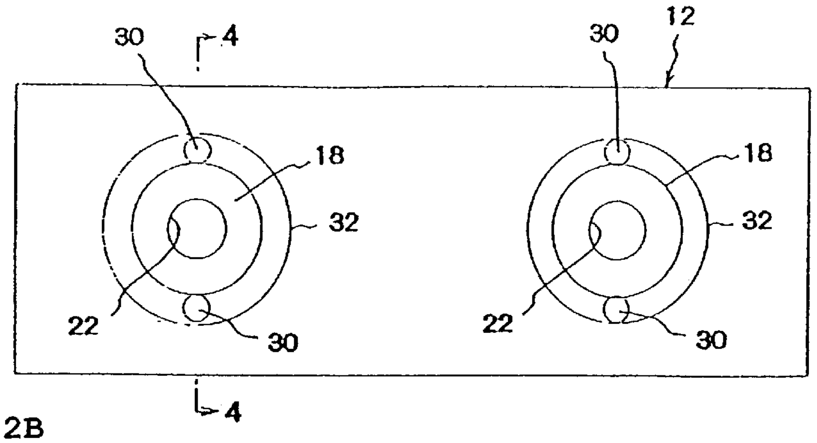
FIG. 2A is a bottom view that illustrates the structure of one embodiment of a second member in the seal structure of the present invention.

On the other hand, the second member 12 has, for instance, a plate-form external shape as seen from FIG. 2A, and a covering layer (hereafter called the "front surface covering layer") 28 consisting of an elastomer is formed on the front ("top" in FIG. 2B) surface of the second member 12. Furthermore, an empty cylindrical protruding section 18 (the shown embodiment has two protruding sections 18 so as to correspond to the recessed sections 16) that fits into the recessed section 16 is formed on the back surface side of the second member 12. The external diameter of the protruding sections 18 is set so as to be smaller than the internal diameter of the recessed section 16.

Figure 3A:
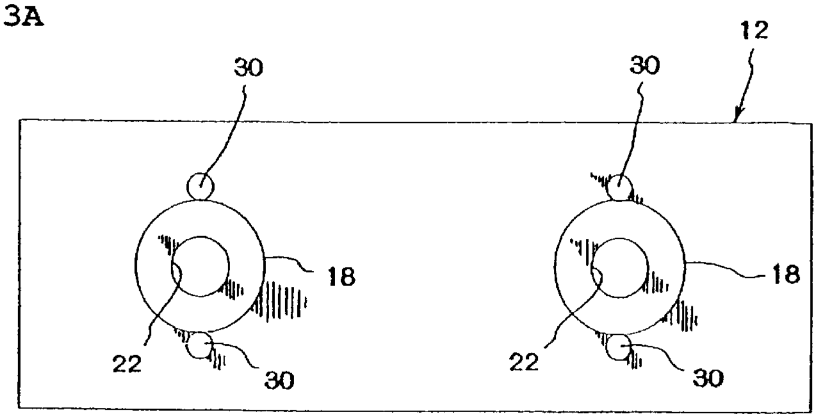
FIG. 3A is a bottom view that illustrates the structure of one embodiment of a second member in the seal structure of the present invention with no covering layer formed thereon.
Figure 3B:
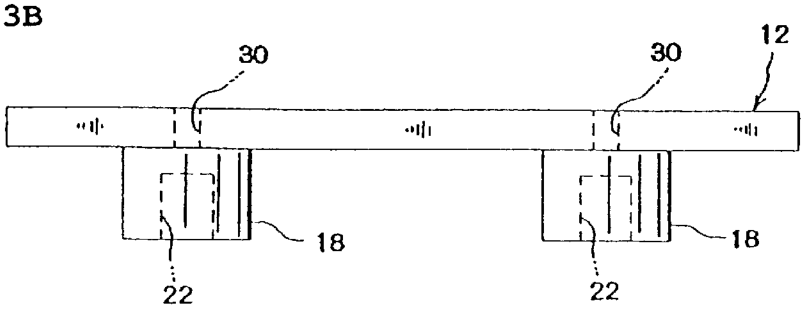
FIG. 3B is a front view thereof.

The characterizing feature of the present embodiment is that one or more through-holes 30 that pass entirely through the second member 12 are formed (beforehand) in positions located at the circumferential edges of the protruding sections 18 of the second member 12 as best seen from FIGS. 3A and 3B. Moreover, the shown embodiment is also characterized by the fact that tubular covering layers (hereafter called "tubular covering layers") 32, that consist of the same elastomer material as that of the front surface covering layer 28, are formed on the outer circumferences of the protruding sections 18 so that the tubular covering layers 32 are continuous from the front surface covering layer 28 via the through-holes 30. Since the tubular covering layers 32 and the front surface covering layer 28 are continuously formed via the through-holes 30, the tubular covering layers 32, unlike the O-rings in the prior art, do not slip off of the protruding sections 18 even if an external force is applied to the tubular covering layers 32 in a direction that would cause such slipping.

In the shown embodiment, two through-holes 30 are provided. Only one through-hole 30 can be formed for each protruding section 18. However, in order to cause the elastomer to flow smoothly around the entire circumference of each protruding section 18 without any irregularity, it is more desirable to form a plurality of through-holes 30, i.e., two or three, at equal intervals around each protruding section 18.

The tubular covering layers 32 are formed on the second member 12 in the following manner. At the time of forming the front surface covering layer 28 on the front surface of the second member 12 by the same method (insert molding) as that used conventionally, molds (not shown) whose internal cavities have a cylindrical shape are set so as to cover the areas around the protruding sections 18 in a concentric arrangement, and the elastomer is then injected on the front surface side of the second member 12. When the injected elastomer flows across the front surface of the second member 12, this elastomer moves to the back side of the second member 12 via the through-holes 30 and fills the tubular spaces formed between the outer circumferential surfaces of the protruding sections 18 and the inner surfaces of the molds that cover the protruding sections 18. As a result, the tubular covering layers 32 consisting of the elastomer are formed on the outer circumferential surfaces of the protruding sections 18.

The internal diameter of the molds that are used and cover the protruding sections 18 is larger (slightly larger) than the internal diameter of the recessed sections 16, so that the external diameter of the molded tubular covering layers 32 is larger (slightly larger) than the internal diameter of the recessed sections 16.

Figure 2B:
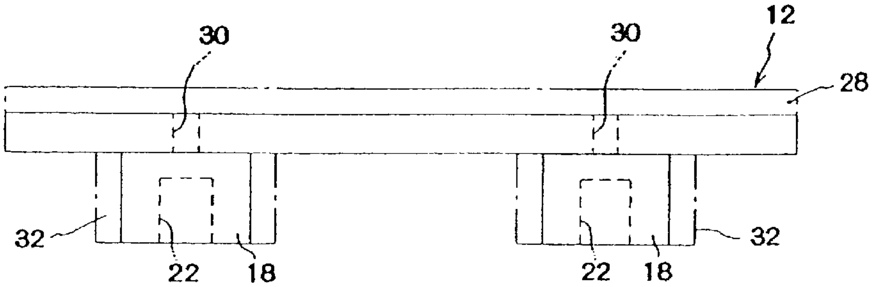
FIG. 2B is a front view thereof.
Figure 5:
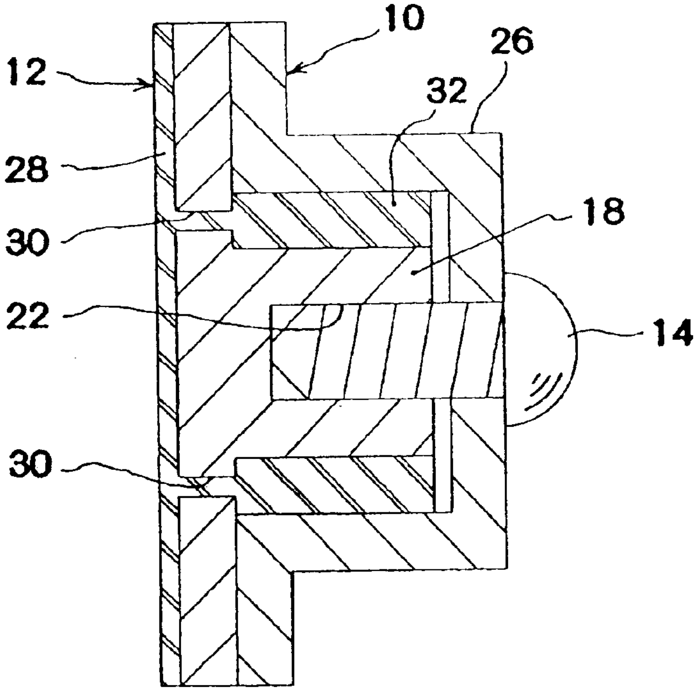
FIG. 5 is a sectional view of the protruding section and the recessed section engaged when the first member of FIGS. 1A and 1B and the second member of FIGS. 2A and 2B are combined.

When the front surface covering layer 28 and the tubular covering layers 32, that are continuous as described above, are formed on the second member 12 as shown in FIGS. 2A and 2B, the second member 12 is assembled with the first member 10. This is done so that the protruding sections 18 are fitted into the recessed sections 16 (as in the conventional example). In other words, the tubular covering layers 32 of the second member 12 are pushed into the recessed sections 16 of the first member 10. Consequently, as seen from FIG. 5, the outer circumferential surfaces of the tubular covering layers (only one layer is shown) 32 formed on the outer circumferential surfaces of the protruding sections (only one protruding section is shown) 18 make an overall surface contact with the inner circumferential surfaces of the recessed sections 16. Since the elastomer forming the tubular covering layers 32 has a rubber-like elasticity, this elastomer covering layers 32 form an airtight or watertight seal between the protruding sections 18 and recessed sections 16 of the first and second members in the same manner O-rings.

Figure 4:
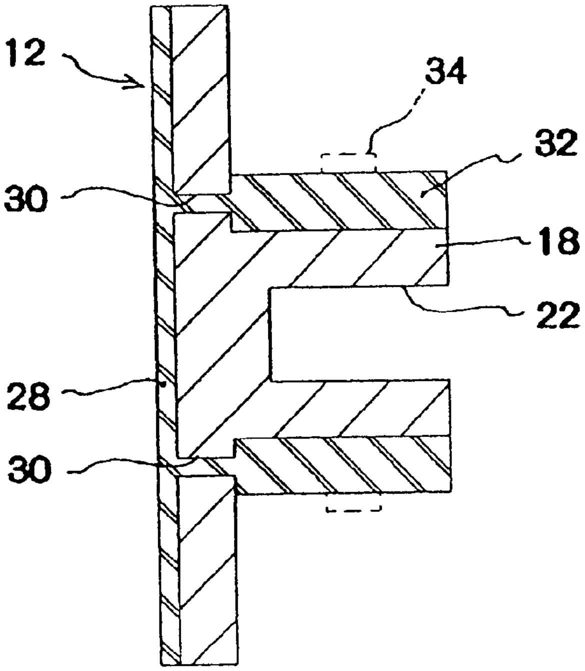
FIG. 4 is a sectional view taken along the line 4—4 in FIG. 2A.

The tubular covering layers 32 in this embodiment have the same or constant external diameter along the axial direction of the protruding sections 18 as shown by the solid lines in FIG. 4 (only one protruding section 18 is shown). However, in order to increase the sealing performance, one or more ring-form projections 34 that extend in the circumferential direction on the outer circumferential surfaces of the tubular covering layers 32 as shown by the dotted lines in FIG. 4 can be formed.

As seen from the above, in the shown embodiment, the diameter of the tubular covering layers 32 formed on the protruding sections 18 is set so that the outer circumferential surfaces of the tubular covering layers make a surface-to-surface contact with the inner circumferential surfaces of the recessed sections 16. As a result, the tubular covering layers 32 form a seal between the protruding sections 18 and recessed sections 16. In this structure, the length of the tubular covering layers 32 in the axial direction of the protruding sections 18 may be shorter than the length of the protruding sections 18, equal to the length of the protruding sections 18, or longer than the length of the protruding sections 18.

Figure 6:
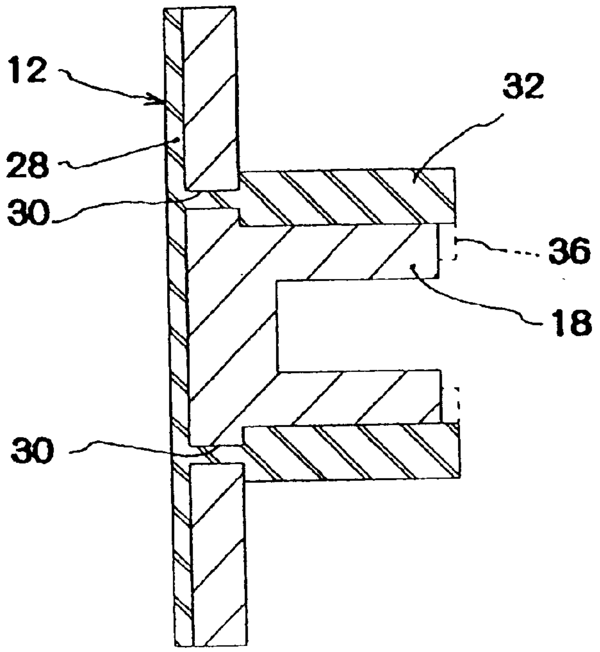
FIG. 6 is a sectional view of another embodiment of the tubular covering layer formed on the protruding section of the second member.
Figure 7:
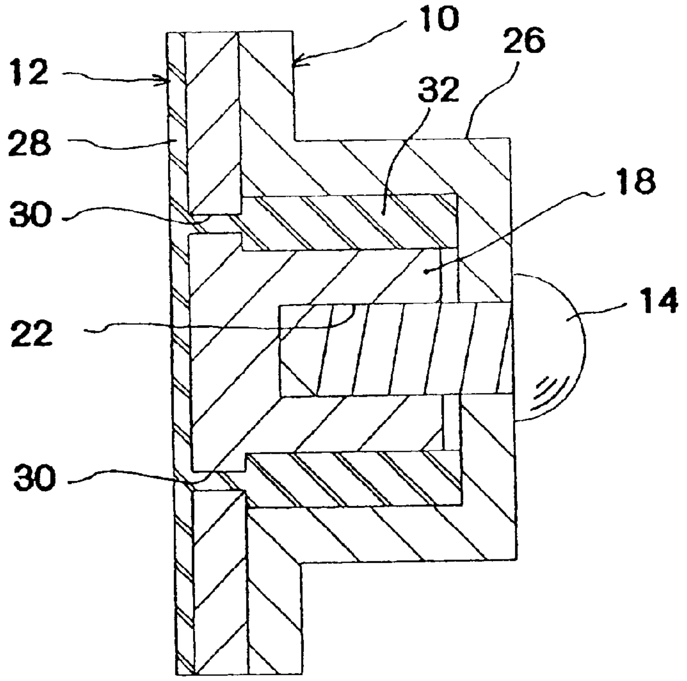
FIG. 7 is a sectional view of the protruding section and the recessed section engaged when the second member of FIG. 6 is combined with the first member.

The tubular covering layers 32 can be formed so as to be longer than the length of the protruding sections 18 as shown in FIG. 6. In other words, the tip ends of the tubular covering layers 32 protrude from the tip end surfaces of the protruding sections 18, and the length of the tubular covering layers 32 is greater than the depth of the recessed sections 16. With this structure, the tip ends of the tubular covering layers 32 contact the bottoms of the recessed sections 16 when the protruding sections 18 of the second member 12 are inserted into the recessed sections 16 of the first member 10 as shown in FIG. 7. Accordingly, a seal is further formed between the tip ends of the tubular covering layers 32 and the bottoms of the recessed sections 16. In other words, in this embodiment, sealing can be formed even if the external diameter of the tubular covering layers 32 is smaller than the internal diameter of the recessed sections 16.

Furthermore, as shown by the dotted lines in FIG. 6, end surface covering layers 36 can be formed on the tip ends of the tubular covering layers 32. The end surface covering layers 36 bend and extend towards the end surfaces of the protruding sections 18 (in other words the layers 36 extend inwardly) so as to cover at least a portion of the entire circumferential tip end surface of each protruding section 18. With this structure, the spaces between the tip end surfaces of the protruding sections 18 and the bottoms of the recessed sections 16 are sealed by these end surface covering layers 36.

Figure 8:
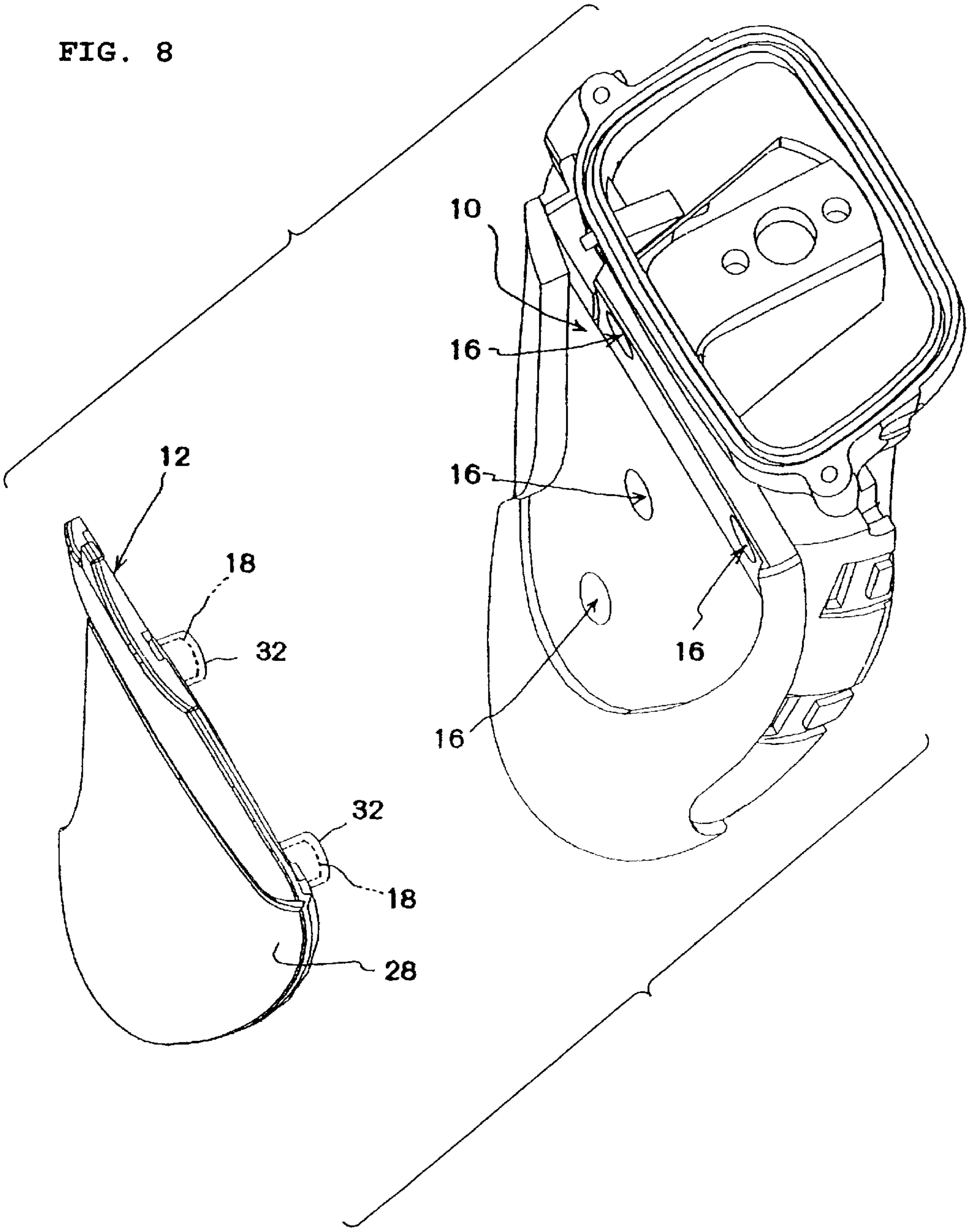
FIG. 8 is an exploded perspective view of the seal structure of the present invention applied to a waterproof type electric shaver.
Figure 9:
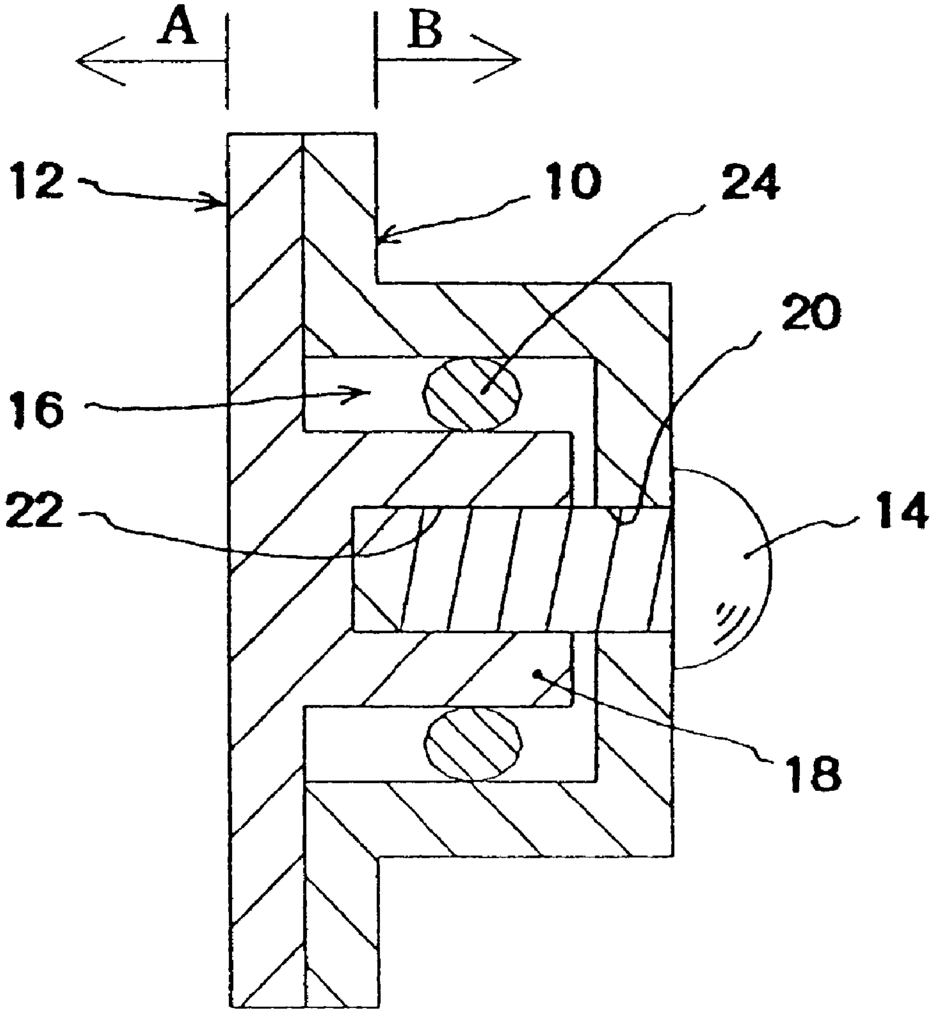
FIG. 9 PRIOR ART
FIG. 9 is a sectional view of an engaged protruding section and recessed section in a conventional seal structure.

FIG. 8 illustrates the seal structure of the present invention applied to a waterproof type electric shaver.

In this shaver, the above-described first member 10 is a part of the main body casing (e.g., the front side of a main body casing) of the waterproof type electric shaver, and the second member 12 is an outer panel of the shaver and is fitted on the first member (the main body casing) 10.

More specifically, a cosmetic layer formed on the front surface of the above-described second member (the outer panel) 12 is the front surface covering layer 28 consisting of an elastomer, and the tubular covering layers 32 are formed on the outer circumferential surfaces of the protruding sections 18 of the second member (the outer panel) 12. As described above, the tubular covering layers 32 are formed, in continuation from the cosmetic layer, on the front surface covering layer. 28 via the through-holes 30 (not shown in FIG. 8) that are formed at the circumferential edges of the protruding sections 18 of the outer panel 12.

The recessed sections 16 equal in number to the protruding sections 18 are formed in the front surface of the main body casing (the first member) 10 so as to positionally correspond to the protruding sections 18.

When the outer panel (second member) 12 is mounted on the front surface of the body casing (first member) 10 by fitting the protruding sections 18 into the recessed sections 16, the spaces between the protruding sections 18 and the recessed sections 16 are sealed by the tubular covering layers 32 formed on the protruding sections 18. The waterproof characteristics of the screw-fastened portions are formed and maintained.

The above description is made with reference to a waterproof type electric shaver. However, the seal structure of the present invention can naturally be used in other household electrical appliances.

In the embodiments above, the cross-sectional shape of the outside surfaces of the protruding sections 18 in the axial direction and the cross-sectional shape of the inside surfaces of the recessed sections 16 are both circular. However, the present invention is indeed applicable to other shapes. The protruding sections 18 and the recessed sections 16 can be elliptical or polygonal shape, for instance.

With the seal structure of the present invention, when the protruding sections of a second member are inserted into the recessed sections of a first member, the covering layers that cover the outer circumferences of the protruding sections contact tightly to both the outer circumferential surfaces of the protruding sections of the second member and the inner circumferential surfaces of the recessed sections of the first member. As a result, the spaces between the protruding sections and recessed sections are sealed. When the covering layer is formed on the front surface of the second member by insert molding using elastomer, covering layers can be simultaneously formed on the outer circumferences of the protruding sections formed on the back side of the second member by way of causing the elastomer to flow onto the outer circumferences of the protruding sections via through-holes.

Accordingly, O-rings are no longer unnecessary; and therefore, the number of components forming a sealing structure is small. Also, the work required for assembling such components is eliminated, and the overall amount of work required can be reduced.

What is claimed is:

1. A seal structure between a first member that has a recessed section and a second member that has a protruding section on a rear surface thereof and is provided on a front surface thereof with a covering layer consisting of an elastomer so that said protruding section is inserted into said recessed section, wherein said second member is provided with a through-hole that passes through said second member, said through-hole being formed at a position located on a circumferential edge of said protruding section of said second member, and said second member is further provided with a tubular covering layer consisting of said elastomer, said tubular covering layer being formed on an outer circumference of said protruding section so that said tubular cover layer is in continuation of said covering formed on said front surface of said second member via said through-hole.

2. The seal structure according to claim 1, wherein an external diameter of said tubular covering layer that covers said outer circumference of said protruding section is larger than an internal diameter of said recessed section.

3. The seal structure according to claim 1, wherein said tubular covering layer that covers said outer circumference of said protruding section is formed so as to protrude from a tip end surface of said protruding section.

* * * * *